US012563600B2

(12) United States Patent
Lu et al.

(10) Patent No.: US 12,563,600 B2
(45) Date of Patent: Feb. 24, 2026

(54) OPERATING METHOD FOR ENHANCED MULTI-LINK SINGLE RADIO, COMMUNICATION APPARATUS, MULTI-LINK DEVICE, AND STORAGE MEDIUM

(71) Applicant: GUANGDONG OPPO MOBILE TELECOMMUNICATIONS CORP., LTD., Dongguan (CN)

(72) Inventors: Liuming Lu, Dongguan (CN); Lei Huang, Singapore (SG)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 19/271,688

(22) Filed: Jul. 16, 2025

(65) Prior Publication Data

US 2025/0344248 A1 Nov. 6, 2025

Related U.S. Application Data

(63) Continuation of application No. 18/762,888, filed on Jul. 3, 2024, which is a continuation of application No. PCT/CN2022/070367, filed on Jan. 5, 2022.

(51) Int. Cl.
*H04W 74/0816* (2024.01)
*H04W 56/00* (2009.01)

(52) U.S. Cl.
CPC ..... *H04W 74/0816* (2013.01); *H04W 56/003* (2013.01)

(58) Field of Classification Search
CPC .................. H04W 74/0816; H04W 56/003
See application file for complete search history.

(56) References Cited

U.S. PATENT DOCUMENTS

2021/0266965 A1 8/2021 Ho et al.
2023/0109759 A1* 4/2023 Ratnam ............. H04W 56/0015
370/329

(Continued)

FOREIGN PATENT DOCUMENTS

CN 105828394 A 8/2016
EP 4358635 A1 4/2024

(Continued)

OTHER PUBLICATIONS

Dibakar Das et al, "CC36-CR for 35.3.15.7", IEEE P802.11 Wireless LANs, IEEE 802.11-21/1339r3, Aug. 24, 2021.

(Continued)

*Primary Examiner* — Charles N Appiah
*Assistant Examiner* — Frank E Donado
(74) *Attorney, Agent, or Firm* — BAYES PLLC

(57) ABSTRACT

An operating method for enhanced multi-link single radio (EMLSR), a communication apparatus, a multi-link device (MLD), a chip, a computer-readable storage medium, a computer program product, and a computer program are provided. The method includes: determining, by a first station, a duration time, wherein the duration time at least covers a first duration where the first station has lost a medium synchronization, wherein the first station is affiliated with an MLD (multi-link device) operating in an EMLSR mode, and the first station operates on a first EMLSR link among a plurality of EMLSR links of the MLD; and determining, by the first station, whether to start a medium synchronization delay timer based on the duration time or whether to update a time value of the medium synchronization delay timer based on a previous medium synchronization delay timer.

20 Claims, 14 Drawing Sheets

(56) References Cited

U.S. PATENT DOCUMENTS

| | | | |
|---|---|---|---|
| 2023/0199652 A1* | 6/2023 | Mehrnoush | H04W 52/0216 |
| | | | 370/311 |
| 2024/0073952 A1* | 2/2024 | Kim | H04W 74/0816 |

FOREIGN PATENT DOCUMENTS

| | | |
|---|---|---|
| WO | 2021145601 A1 | 7/2021 |
| WO | 2023059023 A1 | 4/2023 |

OTHER PUBLICATIONS

First Office Action of the Japanese application No. 2024-540787, issued on Aug. 5, 2025.

First Office Action of the Chinese application No. 202411822040.4, issued on Sep. 16, 2025.

Alfred Asterjadhi et al, "Proposed Draft Specification for leftover TBDs", IEEE P802.11 Wireless LANs, IEEE 802.11-21/0572r4, Apr. 2, 2021.

Edward Au, "IEEE 802.11be CC36 comments", IEEE P802.11 Wireless LANs, IEEE 802.11-21/1018r0, Jun. 28, 2021, p. 50.

Minyoung Park et al, "PDT-TBD-EMLSR mode operation", IEEE 802.11-20/1743r0, Nov. 9, 2020.

Minyoung Park et al, "Proposed Draft Text MAC MLO Enhanced Multi-link Single-Radio Operation", IEEE P802.11 Wireless LANs, IEEE 802.11-20/1291r3, Aug. 20, 2020.

Minyoung Park et al, "CC36 Comment Resolution-EMLSR loss of medium sync", IEEE P802.11 Wireless LANs, IEEE 802.11-21/1484r4, Jan. 12, 2022.

First Office Action of the European application No. 22917747.2, issued on Oct. 14, 2025.

Supplementary European Search Report in the European application No. 22917747.2, mailed on Feb. 10, 2025. 9 pages.

Minyoung Park, CC36 Comment Resolution—EMLSR loss of medium sync, IEEE P802.11 Wireless LANs, IEEE 802.11-21/1484r0, Sep. 3, 2021. pp. 1-4.

International Search Report in the international application No. PCT/CN2022/070367, mailed on Sep. 26, 2022. 4 pages.

Written Opinion of the International Search Authority in the international application No. PCT/CN2022/070367, mailed on Sep. 26, 2022. 4 pages.

IEEE P802.11be™/D1.3, Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT), Nov. 2021. section: 35.3.15.8, 35.3.16.

* cited by examiner

OPERATING METHOD FOR ENHANCED MULTI-LINK SINGLE RADIO, COMMUNICATION APPARATUS, MULTI-LINK DEVICE, AND STORAGE MEDIUM

CROSS REFERENCE TO RELATED APPLICATIONS

This is a continuation of U.S. application Ser. No. 18/762,888, filed on Jul. 3, 2024, which is a continuation of International Application No. PCT/CN2022/070367 filed on Jan. 5, 2022, and entitled "OPERATING METHOD FOR ENHANCED MULTI-LINK SINGLE RADIO, COMMUNICATION APPARATUS, MULTI-LINK DEVICE, AND STORAGE MEDIUM", the disclosure of which is incorporated therein by reference in their entirety.

TECHNICAL FIELD

The present disclosure generally relates to communication mechanisms, in particular, to an operating method for enhanced multi-link single radio (EMLSR), a communication apparatus, a multi-link device (MLD), a chip, a computer-readable storage medium, a computer program product, and a computer program.

BACKGROUND

IEEE 802.11be Draft 1.3 has specified Enhanced multi-link single radio operation, which mainly contains the following steps.

Step 1: The non-AP (access point) MLD (multi-link device) shall be able to listen on the EMLSR links, by having its affiliated non-AP stations (STAs) corresponding to those links in awake state. The listening operation performed by the MLD includes CCA (Clear Channel Assessment) and receiving the initial Control frame of a frame exchange sequence that is initiated by an AP MLD.

Step 2: An AP affiliated with the AP MLD initiates frame exchanges with the non-AP MLD on one of the EMLSR links shall begin the frame exchanges by transmitting the initial Control frame to the non-AP MLD with the limitations specified above.

Step 3: After receiving the initial Control frame of a frame exchange sequence, the non-AP MLD shall be able to transmit or receive frames on the link in which the initial Control frame was received and shall not transmit or receive on the other EMLSR link(s) until the end of the frame exchange sequence, and subject to its spatial stream capabilities, operation mode, and link switch delay, the non-AP MLD shall be capable of receiving a PPDU that is sent using more than one spatial stream on the link in which the initial Control frame was received a SIFS (Short Interval Frame Space) after the end of its response frame transmission solicited by the initial Control frame. During the frame exchange sequence, the AP MLD shall not transmit frames to the non-AP MLD on the other EMLSR link(s). The non-AP MLD switches back to the listening operation on the enabled links immediately after the end of the frame exchange sequence.

However, the following problems need to be addressed about EMLSR. (1) When a non-AP STA of a non-AP MLD is exchanging frames with an AP of the AP MLD on one of the EMLSR links, the other non-AP STAs on the EMLSR links are blind. This is similar to the blindness problem of the NSTR (Non-simultaneous transmit and receive) non-AP MLD operation. Also, when the non-AP MLD performs the listening operation, it can only decode the OFDM (orthogonal frequency division multiplexing) PPDU (Presentation Protocol Data Unit) and non-HT (non-High Throughput) PPDU formats and thus may be limited to synchronizing to the medium.

(2) A non-AP STA of a non-AP MLD in EMLSR mode may lost medium synchronization during a frame exchange sequence of another non-AP STA affiliated with the same MLD. Therefore, the medium access recovery procedure is also required for the non-AP STA of an MLD in EMLSR mode, which is not clear in the current IEEE 802.11be Draft 1.3.

SUMMARY

Accordingly, the disclosure is directed to an operating method for EMLSR, a communication apparatus, a MLD, a chip, a computer-readable storage medium, a computer program product, and a computer program, which may be used to solve the above technical problems.

According to one or more exemplary embodiments of the disclosure, an operating method for EMLSR is provided. The method includes: determining, by a first station, a duration time, wherein the duration time at least covers a first duration where the first station has lost a medium synchronization, wherein the first station is affiliated with an MLD (multi-link device) operating in an EMLSR mode, and the first station operates on a first EMLSR link among a plurality of EMLSR links of the MLD; and determining, by the first station, whether to start a medium synchronization delay timer based on the duration time or whether to update a time value of the medium synchronization delay timer based on a previous medium synchronization delay timer.

According to one or more exemplary embodiments of the disclosure, an operating method for EMLSR is provided. The method includes: when determining that a duration time exceeds a medium synchronization threshold, starting, by a first station, the medium synchronization delay timer or when determining that the previous medium synchronization delay timer is not expired, updating, by the first station, the time value of the medium synchronization delay timer, wherein the first station is affiliated with a MLD (multi-link device) operating in an EMLSR mode, and the first station operates on a first EMLSR link among a plurality of EMLSR links of the MLD; and determining, by the first station, whether to transmit an initial frame of a transmission opportunity (TXOP) obtained by the first station based on the medium synchronization delay timer.

According to one or more exemplary embodiments of the disclosure, a communication apparatus is provided. The communication apparatus includes a determining module configured for: determining a duration time, wherein the duration time at least covers a first duration where the first station has lost a medium synchronization, wherein the first station is affiliated with an MLD (multi-link device) operating in an EMLSR mode, and the first station operates on a first EMLSR link among a plurality of EMLSR links of the MLD; and determining whether to start a medium synchronization delay timer based on the duration time or whether to update a time value of the medium synchronization delay timer based on a previous medium synchronization delay timer.

According to one or more exemplary embodiments of the disclosure, a communication apparatus is provided. The communication apparatus includes a determining module configured for: when determining that a duration time exceeds a medium synchronization threshold, starting, by a first station, the medium synchronization delay timer or when determining that the previous medium synchronization delay timer is not expired, updating, by a first station, the time value of the medium synchronization delay timer, wherein the first station is affiliated with a MLD (multi-link device) operating in an EMLSR mode, and the first station operates on a first EMLSR link among a plurality of EMLSR links of the MLD; and determining whether to transmit an initial frame of a transmission opportunity (TXOP) obtained by the first station based on the medium synchronization delay timer.

According to one or more exemplary embodiments of the disclosure, an MLD is provided. The MLD includes a memory and a processor. The memory is configured to store instructions. The processor is coupled with the memory and configured to execute the instructions to cause the MLD to perform the aforementioned operating method for EMLSR.

According to one or more exemplary embodiments of the disclosure, a chip is provided. The chip is used to implement the aforementioned operating method for EMLSR.

According to one or more exemplary embodiments of the disclosure, a computer-readable storage medium is provided. The computer-readable storage medium stores a program code to cause a computer to perform the aforementioned operating method for EMLSR.

According to one or more exemplary embodiments of the disclosure, a computer program product is provided. The computer program product includes a computer program instruction that enables a computer to execute the aforementioned operating method for EMLSR.

According to one or more exemplary embodiments of the disclosure, a computer program is provided. When the computer program is run on a computer, the computer program enables the computer to execute the aforementioned operating method for EMLSR.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DETAILED DESCRIPTION

Figure 1:
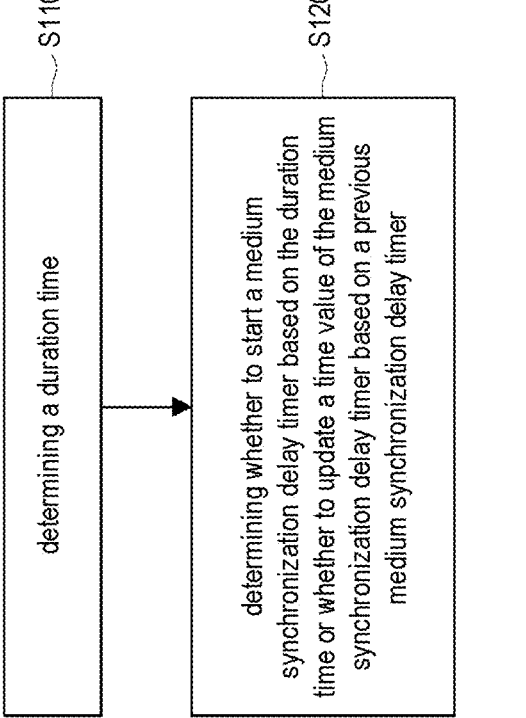
FIG. 1 shows a flow chart of the operating method for EMLSR according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

IEEE 802.11be Draft 1.3 has specified "35.3.16 Enhanced multi-link single radio operation". The key content of EMLSR is described in the following.

When a non-AP MLD is operating in the EMLSR mode with an AP MLD supporting the EMLSR mode, the following applies.

(1) The non-AP MLD shall be able to listen on the EMLSR links, by having its affiliated non-AP STA(s) corresponding to those links in awake state. The listening operation includes CCA and receiving the initial Control frame of a frame exchange sequence that is initiated by an AP MLD.

(2) The initial Control frame of a frame exchange sequence shall be sent in the OFDM PPDU or non-HT duplicate PPDU format using a rate of 6 Mbps, 12 Mbps, or 24 Mbps.

(3) The initial Control frame shall be an MU-RTS (Multi-user Request To Send) Trigger frame or a BSRP Trigger frame. Reception of MU-RTS and BSRP (Buffer Status Report Poll) Trigger frames is mandatory for a non-AP MLD that is in the EMLSR mode. The number of spatial streams for the response to the BSRP Trigger frame shall be limited to one.

(4) The non-AP MLD shall indicate the delay time duration in the EMLSR Delay subfield of the EML Capabilities subfield in the Common Info field of the Basic Multi-Link element.

(5) An AP affiliated with the AP MLD initiates frame exchanges with the non-AP MLD on one of the EMLSR links shall begin the frame exchanges by transmitting the initial Control frame to the non-AP MLD with the limitations specified above.

(6) After receiving the initial Control frame of a frame exchange sequence, the non-AP MLD shall be able to transmit or receive frames on the link in which the initial Control frame was received and shall not transmit or receive on the other EMLSR link(s) until the end of the frame exchange sequence, and subject to its spatial stream capabilities, operation mode, and link switch delay, the non-AP MLD shall be capable of receiving a PPDU that is sent using more than one spatial stream on the link in which the initial Control frame was received a SIFS after the end of its response frame transmission solicited by the initial Control frame. During the frame exchange sequence, the AP MLD shall not transmit frames to the non-AP MLD on the other EMLSR link(s). The non-AP MLD switches back to the listening operation on the enabled links immediately after the end of the frame exchange sequence.

(7) Only one non-AP STA affiliated with the non-AP MLD that is operating on one of the EMLSR links may initiate frame exchanges with the AP MLD. In one embodiment, a non-AP STA affiliated with a non-AP MLD operating in the EMLSR mode does not need to transmit an initial Control frame to initiate frame exchanges with the AP MLD.

In the embodiments of the disclosure, when a non-AP MLD is operating in the EMLSR mode, a non-AP STA affiliated with the non-AP MLD operating on one of the EMLSR links is unable to listen on its corresponding link and considered to have lost the medium synchronization during the time that the non-AP MLD is not in listening operation on the EMLSR links for one of the other non-AP STA(s) operating on the other EMLSR link(s) that are affiliated with the same non-AP MLD exchanges frames. The listening operation includes CCA and receiving the initial Control frame of a frame exchange sequence that is initiated by an AP MLD.

In the embodiments of the disclosure, an operating method for EMLSR is provided to solve the above technical problem. Detailed discussion would be provided in the following.

See FIG. 1, which shows a flow chart of the operating method for EMLSR according to an embodiment of the disclosure. The method of this embodiment may be executed by a first station 110. In the embodiments of the disclosure, the first station 110 is one of the non-AP STAs affiliated with a non-AP MLD 10 operating in the EMLSR mode. In one embodiment, the non-AP MLD 10 has a plurality of EMLSR links, and the first station 110 operates on a first EMLSR link L1 among the EMLSR links of the non-AP MLD 10.

In step S110, the first station 110 determines a duration time T0. In the embodiments of the disclosure, the duration time T0 at least covers a first duration D1 where the first station 110 has lost the medium synchronization. In one embodiment, the duration time T0 can be equal to the first duration D1. In one embodiment, the duration time T0 includes the first duration D1, which represents that the first duration D1 is a part of the duration time T0, but the disclosure is not limited thereto. In various embodiments, the duration time T0 and the first duration D1 can be implemented in different ways, which would be discussed with the following embodiments.

In step S120, the first station 110 determines whether to start a medium synchronization delay timer based on the duration time T0 or whether to update a time value of the medium synchronization delay timer based on a previous medium synchronization delay timer.

In one embodiment, the first duration D1 where the first station 110 has lost the medium synchronization at least covers a second duration D2 from the non-AP MLD 10 switching from a listening operation on EMLSR links to a frame exchange operation to the non-AP MLD 10 switching back to the listening operation from the frame exchange operation, wherein the frame exchange operation is performed on a second EMLSR link L2 where a second station 120 operates on. In one embodiment, the second duration D2 can be equal to the first duration D1. In one embodiment, the first duration D1 includes the second duration D2, which represents that the second duration D2 is a part of the first duration D1. In one embodiment, the duration time T0, the first duration D1, and the second duration D2 are identical to each other, but the disclosure is not limited thereto.

In another embodiment, the first duration D1 where the first station 110 has lost the medium synchronization at least covers a third duration D3 between a first event and a second event. In one embodiment, the first event is where the non-AP MLD 10 switches from a listening operation to a frame exchange operation. In one embodiment, the second event is where the non-AP MLD 10 switches back to the listening operation from the frame exchange operation. In one embodiment, the third duration D3 can be equal to the first duration D1. In one embodiment, the first duration D1 includes the third duration D3, which represents that the third duration D3 is a part of the first duration D1. In one embodiment, the duration time T0, the first duration D1, and the third duration D3 are identical to each other, but the disclosure is not limited thereto.

In one embodiment, the listening operation is performed on the EMLSR links. In some embodiments, the frame exchange operation is performed on the second EMLSR link L2 where the second station 120 operates on. In one embodiment, the second station 120 is another of the non-AP STAs affiliated with the non-AP MLD 10 operating in the EMLSR mode, and the second EMLSR link L2 is one of the EMLSR links of the non-AP MLD 10.

In the following embodiments, the second station 120 is assumed to be the non-AP STA that performs a frame exchange during the non-AP MLD 10 is in the frame exchange operation.

In one embodiment, the non-AP MLD 10 can be used to communicate with an AP MLD 20, which includes a plurality of AP STAs. In one embodiment, the AP STAs of the AP MLD 20 includes a first AP STA 210 and a second AP STA 220, wherein the first AP STA 210 can correspond to the first station 110, and the second AP STA 220 can correspond to the second station 120. In particular, the first station 110 and the second station 120 respectively communicate with the first AP STA 210 and the second AP STA 220 in the AP MLD 20 via the first EMLSR link L1 and the second EMLSR link L2.

In one embodiment, the first station 110 can determine whether the non-AP MLD 110 is performing the listening operation. In one embodiment, when determining that the non-AP MLD 10 is performing the listening operation, the first station 110 can determine whether the first station 110 loses the medium synchronization due to the frame exchange started between the second station 120 and the second AP STA 220. In one embodiment, the first station 110 is unable to listen on the first EMLSR link L1 during the second station 120 performing the frame exchange with the second AP STA 220.

In one embodiment, when determining that the first station 110 loses the medium synchronization, the first station 110 can determine that the non-AP MLD 10 switches from the listening operation to the frame exchange operation. In one embodiment, when determining that the non-AP MLD 10 switches back to the listening operation based on an end of the frame exchange, the first station 110 can determine that the non-AP MLD 10 switches back to the listening operation from the frame exchange operation.

As mentioned in the above, the first duration D1 can be implemented in different ways, and further details would be provided in the following.

Figure 2A:
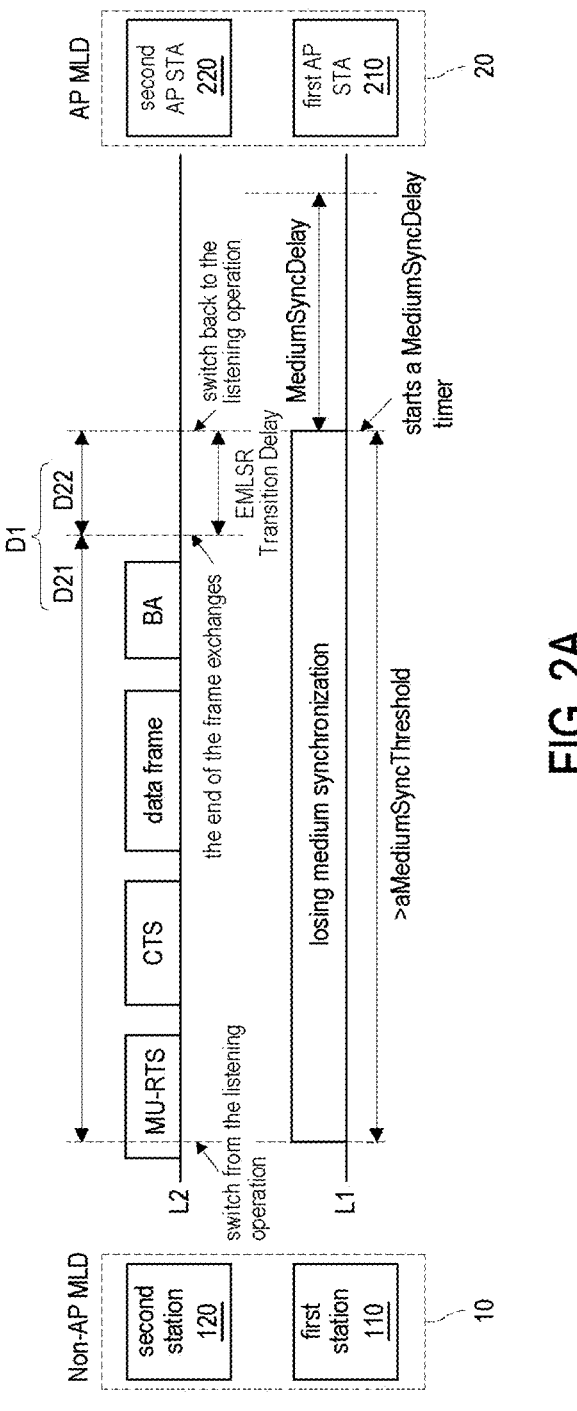
FIG. 2A shows a schematic diagram of an EMLSR transmission between the non-AP MLD and the AP MLD according to a first embodiment of the disclosure.

See FIG. 2A, which shows a schematic diagram of an EMLSR transmission between the non-AP MLD and the AP MLD according to a first embodiment of the disclosure. In FIG. 2A, the first duration D1 is a sum of a duration D21 from the non-AP MLD 10 switching from the listening operation to the frame exchange operation to the end of the frame exchange and a transition delay D22 of the non-AP MLD 10. In one embodiment, the transition delay is the time needed by the non-AP MLD 10 to switch from exchanging frames on one of the EMLSR links to the listening operation on the EMLSR links. In FIG. 2A, the transition delay is indicated in the EMLSR Transition Delay subfield of EML Capabilities subfield of Basic Multi-Link element, but the disclosure is not limited thereto.

In FIG. 2A, when the non-AP MLD 10 is operating in the EMLSR mode with the AP MLD 20 supporting the EMLSR mode, the non-AP MLD 10 can switch from the listening operation to the frame exchange operation after the second station 120 receives the initial Control frame of frame exchanges. In one embodiment, the non-AP MLD 10 can switch back to the listening operation after the (EMLSR) transition delay D22 following the end of the frame exchanges between the second station 120 and the second AP STA 220.

In FIG. 2A, the frame exchange between the second station 120 and the second AP STA 220 can exemplarily include: (1) the MU-RTS frame from the second AP STA 220 to the second station 120; (2) the CTS frame from the second station 120 to the second AP STA 220; (3) the data frame from the second AP STA 220 to the second station 120; and (4) the BA (block acknowledgment) from the second station 120 to the second AP STA 220, but the disclosure is not limited thereto.

In the scenario of FIG. 2A, the duration time T0 of the first station 110 losing the medium synchronization for one of the other non-AP STAs operating on the other EMLSR links at least covers the first duration D1. For example, the duration time T0 can be equal to the first duration D1 in FIG. 2A. If the duration time T0 of the first station 110 losing the medium synchronization (due to the frame exchange of the second station 120 on the second EMLSR link L2) is longer than a medium synchronization threshold (shown as aMediumSyncThreshold in FIG. 2A and other figures), the first station 110 starts the medium synchronization delay timer (shown as MediumSyncDelay timer in FIG. 2A and other figures) immediately after the non-AP MLD returning to the listening operation.

Figure 2B:
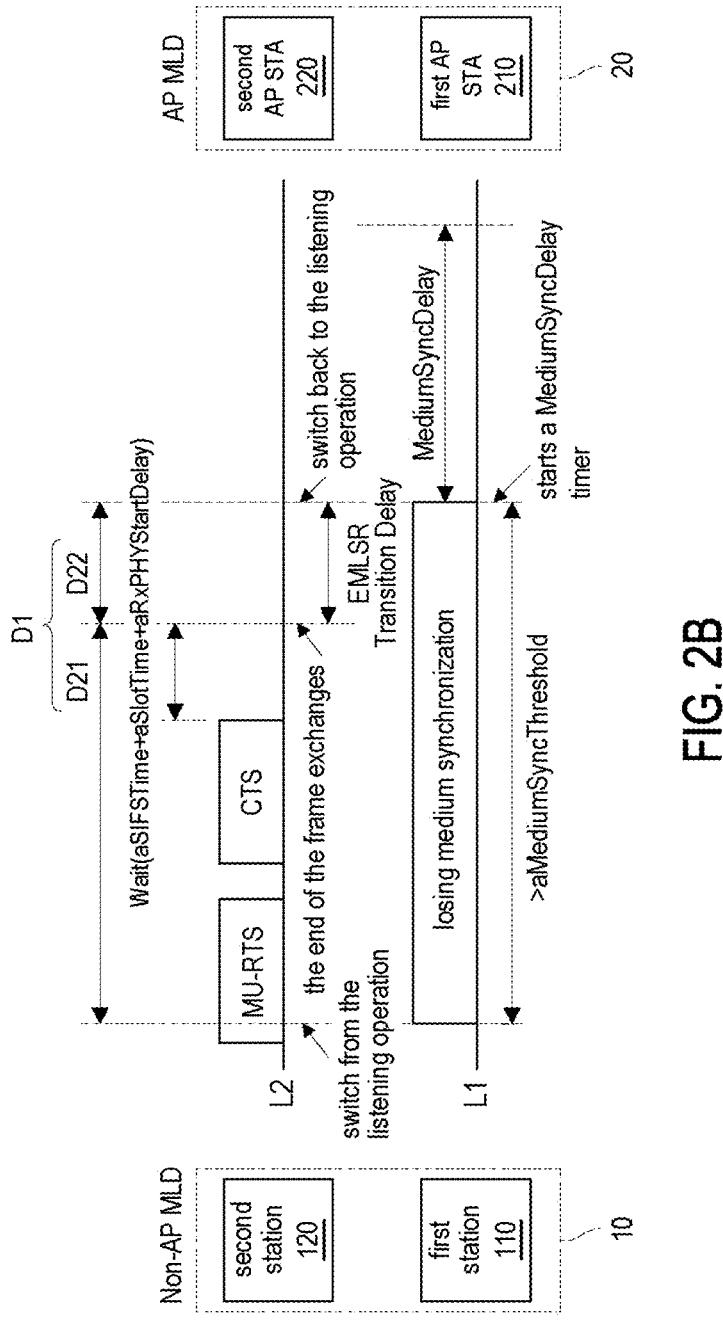
FIG. 2B shows another schematic diagram of the EMLSR transmission between the non-AP MLD and the AP MLD according to the first embodiment of the disclosure.

See FIG. 2B, which shows another schematic diagram of the EMLSR transmission between the non-AP MLD and the AP MLD according to the first embodiment of the disclosure. In FIG. 2B, the first duration D1 is a sum of a duration D21 from the non-AP MLD 10 switching from the listening operation to the frame exchange operation to the end of the frame exchange and a transition delay D22 of the non-AP MLD 10.

In FIG. 2B, the frame exchange between the second station 120 and the second AP STA 220 can exemplarily include: (1) the MU-RTS frame from the second AP STA 220 to the second station 120; (2) the CTS frame from the second station 120 to the second AP STA 220.

In FIG. 2B, the end of the frame exchange between the second AP STA 220 to the second station 120 can be determined by adding a wait time to the end of the CTS frame. In one embodiment, the wait time can be a sum of a Short Interframe Space (SIFS) time (shown as aSIFSTime in FIG. 2B and other figures), a slot time (shown as aSlotTime in FIG. 2B and other figures), a receiving physical start delay (shown as aRxPHYStartDelay in FIG. 2B and other figures), wherein the definitions/values of aSIFSTime, aSlotTime, and aRxPHYStartDelay can be referred to related communication standards, such as IEEE 802.11be or the like.

In the scenario of FIG. 2B, the duration time T0 of the first station 110 losing the medium synchronization for one of the other non-AP STAs operating on the other EMLSR links at least covers the first duration D1. For example, the duration time T0 can be equal to the first duration D1 in FIG. 2B. If the duration time T0 of the first station 110 losing the medium synchronization (due to the frame exchange of the second station 120 on the second EMLSR link L2) is longer than the medium synchronization threshold (i.e., aMediumSyncThreshold), the first station 110 starts the medium synchronization delay timer (i.e., MediumSyncDelay timer) immediately after the non-AP MLD 10 returning to the listening operation. On the other hand, if the duration time T0 of the first station 110 losing the medium synchronization is smaller or equal to the medium synchronization threshold (i.e., aMediumSyncThreshold), the first station 110 do not start the medium synchronization delay timer (i.e., MediumSyncDelay timer) after the non-AP MLD 10 returning to the listening operation.

In the first embodiment, when determining that the previous medium synchronization delay timer is not expired, the first station 110 updates the time value of the medium synchronization delay timer. In one embodiment, the first station 110 can update the time value of the medium synchronization delay timer to be a predetermined value. In another embodiment, the first station 110 can update the time value of the medium synchronization delay timer to be the time value of the previous medium synchronization delay timer, but the disclosure is not limited thereto.

Figure 3:
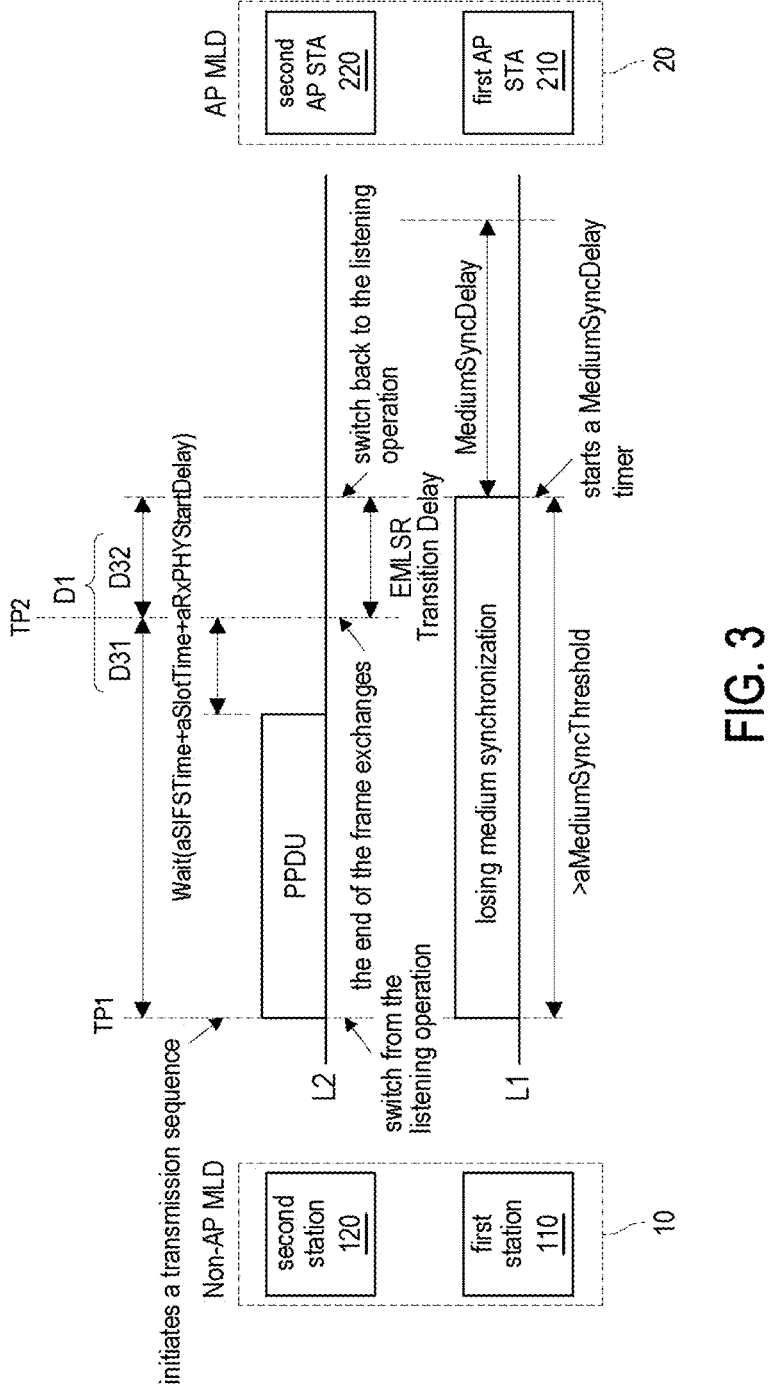
FIG. 3 shows a schematic diagram of the EMLSR transmission between the non-AP MLD and the AP MLD according to a second embodiment of the disclosure.

See FIG. 3, which shows a schematic diagram of the EMLSR transmission between the non-AP MLD and the AP MLD according to a second embodiment of the disclosure.

In FIG. 3, when the non-AP MLD 10 is operating in the EMLSR mode with the AP MLD 20 supporting the EMLSR mode, once the second station 120 affiliated with the non-AP MLD 10 operating on the second EMLSR link L2 initiates a transmission sequence with the second AP STA 220 for a first transmission opportunity (TXOP) or in a TXOP, the non-AP MLD 10 determines that the frame exchange is started between the second station 120 and the second AP STA 220. Accordingly, the non-AP MLD 10 starts to switch from the listening operation to the frame exchange operation. In this case, other non-AP STAs (e.g., the first station 110) operating on the other EMLSR links will lose the medium synchronization. If the transmission of an MPDU in the initial PPDU of the TXOP fails, the non-AP MLD 10 will switch back to the listening operation after EMLSR Transition Delay when the second station 220 confirms that the transmission of an MPDU in the initial PPDU of the TXOP fails.

In the scenario of FIG. 3, the duration time T0 of the first station 110 losing the medium synchronization at least covers the first duration D1. For example, the duration time T0 can be equal to the first duration D1 in FIG. 3. In the second embodiment, the first duration D1 is a sum of a transition delay D32 and a duration D31 between a first timing point TP1 and a second timing point TP2, wherein the first timing point TP1 is a timing point when the non-AP MLD 10 switches from the listening operation to the frame exchange operation, and the second timing point TP2 is a timing point when the non-AP MLD 10 determines that a transmission of the medium access control (MAC) protocol data unit (MPDU) in an initial PPDU of the first TXOP fails.

In FIG. 3, the second timing point TP2 can be determined by adding the wait time to the end of the PPDU. In one embodiment, the wait time can be a sum of aSIFSTime, aSlotTime, and aRxPHYStartDelay.

In the second embodiment, if the duration time T0 of the first station 110 losing the medium synchronization (due to the frame exchange of the second station 120 on the second EMLSR link L2) is longer than the medium synchronization threshold (i.e., aMediumSyncThreshold), the first station 110 starts the medium synchronization delay timer (i.e., MediumSyncDelay timer) immediately after the non-AP MLD 10 returning to the listening operation. On the other hand, if the duration time T0 of the first station 110 losing the medium synchronization is smaller or equal to the medium synchronization threshold (i.e., aMediumSync-Threshold), the first station 110 do not start the medium synchronization delay timer (i.e., MediumSyncDelay timer) after the non-AP MLD 10 returning to the listening operation.

In the second embodiment, when determining that the previous medium synchronization delay timer is not expired, the first station 110 updates the time value of the medium synchronization delay timer. In one embodiment, the first station 110 can update the time value of the medium synchronization delay timer to be a predetermined value. In another embodiment, the first station 110 can update the time value of the medium synchronization delay timer to be the time value of the previous medium synchronization delay timer, but the disclosure is not limited thereto.

Figure 4:
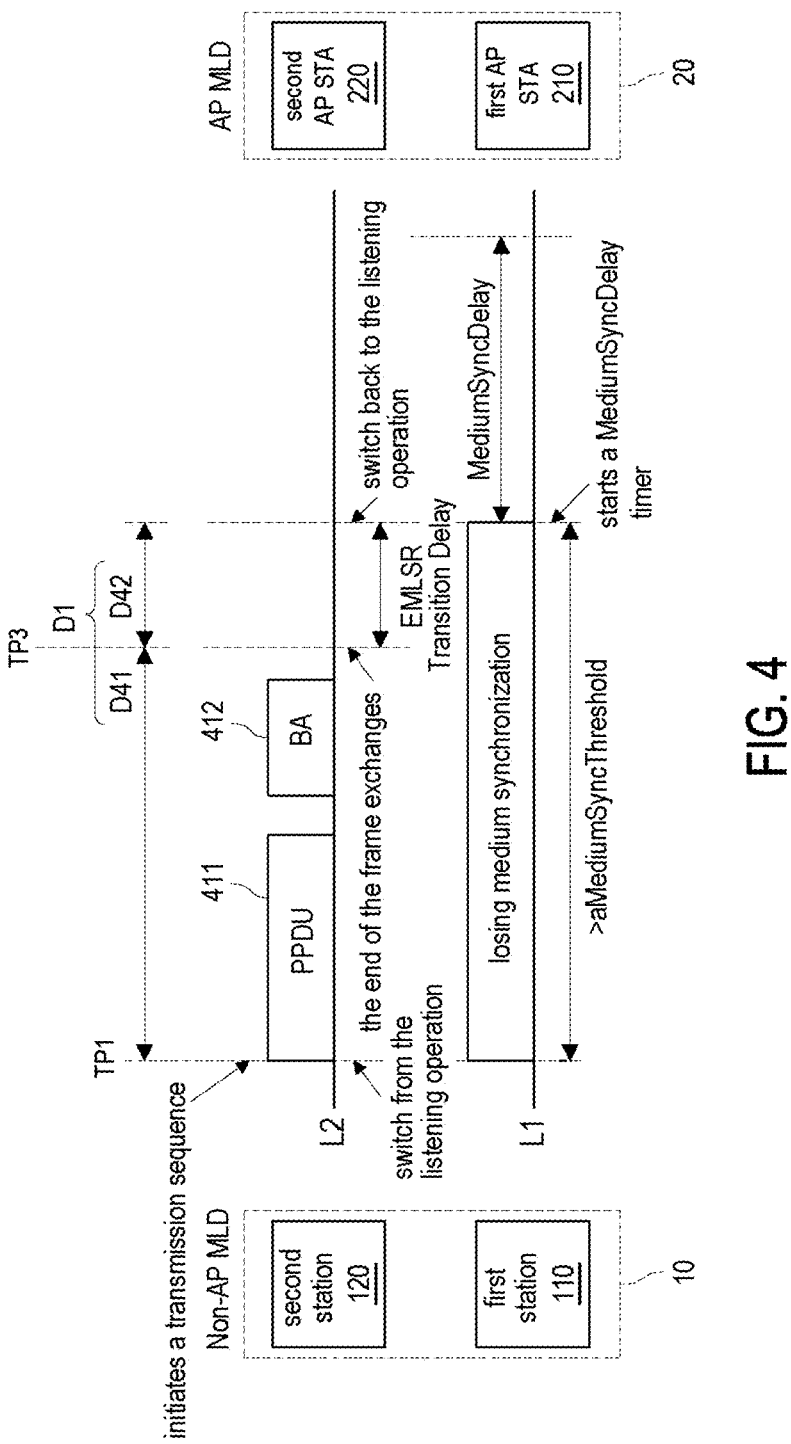
FIG. 4 shows a schematic diagram of the EMLSR transmission between the non-AP MLD and the AP MLD according to a third embodiment of the disclosure.

See FIG. 4, which shows a schematic diagram of the EMLSR transmission between the non-AP MLD and the AP MLD according to a third embodiment of the disclosure.

In FIG. 4, when the non-AP MLD 10 is operating in the EMLSR mode with the AP MLD 20 supporting the EMLSR mode, once the second station 120 affiliated with the non-AP MLD 10 operating on the second EMLSR link L2 initiates a transmission sequence with the second AP STA 220 in the first TXOP, the non-AP MLD 10 determines that the frame exchange is started between the second station 120 and the second AP STA 220. Accordingly, the non-AP MLD 10 starts to switch from the listening operation to the frame exchange operation. In this case, other non-AP STAs (e.g., the first station 110) operating on the other EMLSR links will lose the medium synchronization. In the third embodiment, the non-AP MLD 10 will switch back to the listening operation after EMLSR Transition Delay following the end of the frame exchange or the end of the first TXOP.

In FIG. 4, the transmission sequence between the second station 120 and the second AP STA 220 can exemplarily include: (1) a PPDU 411 sent from the second station 120 to the second AP STA 220; (2) a BA 412 sent from the second AP STA 220 to the second station 120.

In the scenario of FIG. 4, the duration time T0 of the first station 110 losing the medium synchronization at least covers the first duration D1. For example, the duration time T0 can be equal to the first duration D1 in FIG. 4. In the third embodiment, the first duration D1 is a sum of a (EMLSR) transition delay D42 and a duration D41 between a first timing point TP1 and a third timing point TP3, wherein the first timing point TP1 is a timing point when the non-AP MLD 10 switches from the listening operation to the frame exchange operation, and the third timing point TP3 is a timing point of an end time of the frame exchange (e.g., the end time of the BA 412) or an end time of the first TXOP.

In the third embodiment, if the duration time T0 of the first station 110 losing the medium synchronization (due to the frame exchange of the second station 120 on the second EMLSR link L2) is longer than the medium synchronization threshold (i.e., aMediumSyncThreshold), the first station 110 starts the medium synchronization delay timer (i.e., MediumSyncDelay timer) immediately after the non-AP MLD 10 returning to the listening operation. On the other hand, if the duration time T0 of the first station 110 losing the medium synchronization is smaller or equal to the medium synchronization threshold (i.e., aMediumSync-Threshold), the first station 110 do not start the medium synchronization delay timer (i.e., MediumSyncDelay timer) after the non-AP MLD 10 returning to the listening operation.

In the third embodiment, when determining that the previous medium synchronization delay timer is not expired, the first station 110 updates the time value of the medium synchronization delay timer. In one embodiment, the first station 110 can update the time value of the medium synchronization delay timer to be a predetermined value. In another embodiment, the first station 110 can update the time value of the medium synchronization delay timer to be the time value of the previous medium synchronization delay timer, but the disclosure is not limited thereto.

Figure 5:
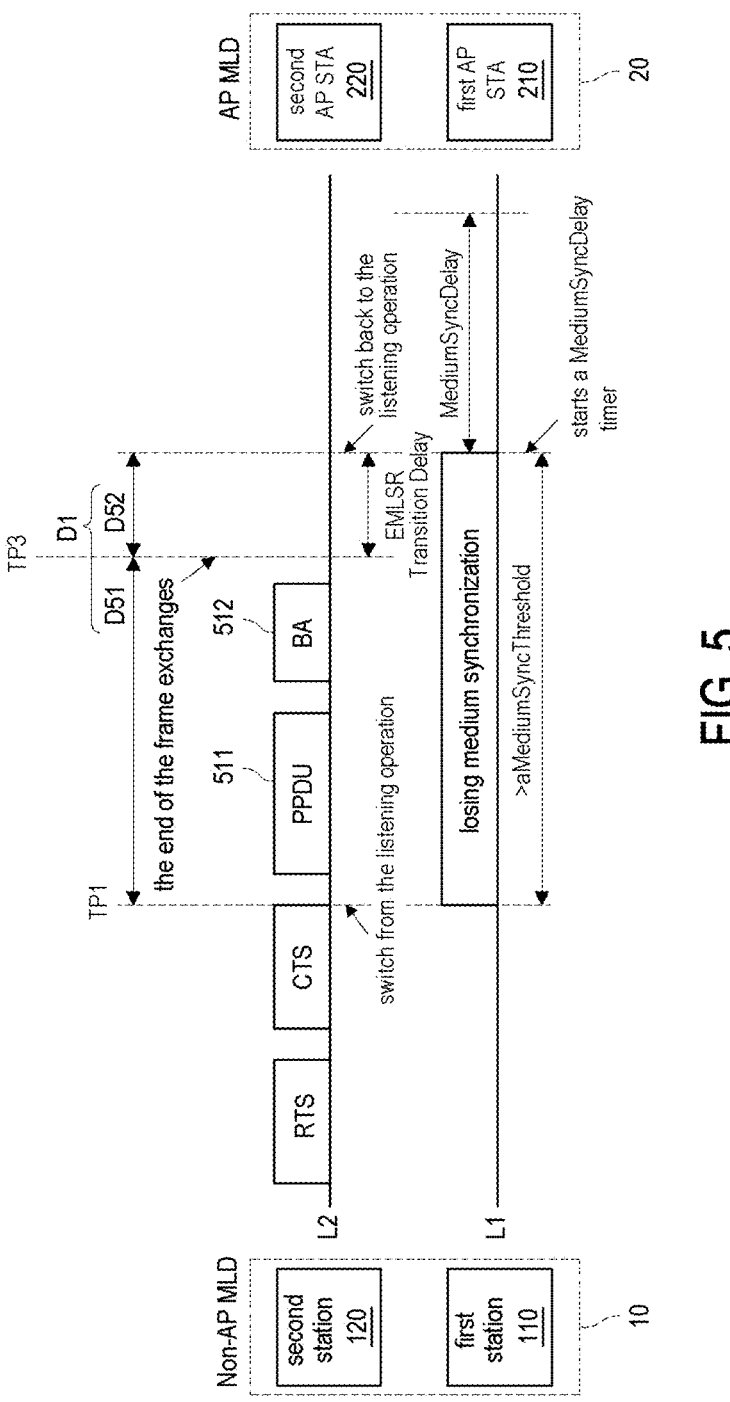
FIG. 5 shows a schematic diagram of the EMLSR transmission between the non-AP MLD and the AP MLD according to a fourth embodiment of the disclosure.

See FIG. 5, which shows a schematic diagram of the EMLSR transmission between the non-AP MLD and the AP MLD according to a fourth embodiment of the disclosure.

In FIG. 5, the non-AP MLD 10 is operating in the EMLSR mode with the AP MLD 20 supporting the EMLSR mode. In the fourth embodiment, when determining that the second station 120 obtains the first TXOP with the second AP STA 220, the non-AP MLD 10 determines that the frame exchange is started between the second station 120 and the second AP STA 220. Accordingly, the non-AP MLD 10 starts to switch from the listening operation to the frame exchange operation. In this case, other non-AP STAs (e.g., the first station 110) operating on the other EMLSR links will lose the medium synchronization. In the fourth embodiment, the non-AP MLD 10 switches back to the listening operation after EMLSR Transition Delay following the end of the frame exchange (e.g., the end time of the BA 512) or the end of the first TXOP.

In FIG. 5, the frame exchange between the second station 120 and the second AP STA 220 can exemplarily include: (1) a PPDU 511 sent from the second station 120 to the second AP STA 220; (2) a BA 512 sent from the second AP STA 220 to the second station 120.

In the scenario of FIG. 5, the duration time T0 of the first station 110 losing the medium synchronization at least covers the first duration D1. For example, the duration time T0 can be equal to the first duration D1 in FIG. 5. In the fourth embodiment, the first duration D1 is a sum of a (EMLSR) transition delay D52 and a duration D51 between a first timing point TP1 and a third timing point TP3, wherein the first timing point TP1 is a timing point when the non-AP MLD 10 switches from the listening operation to the frame exchange operation, and the third timing point TP3 is a timing point of an end time of the frame exchange or an end time of the first TXOP.

In the fourth embodiment, if the duration time T0 of the first station 110 losing the medium synchronization (due to the frame exchange of the second station 120 on the second EMLSR link L2) is longer than the medium synchronization threshold (i.e., aMediumSyncThreshold), the first station 110 starts the medium synchronization delay timer (i.e., MediumSyncDelay timer) immediately after the non-AP MLD 10 returning to the listening operation. On the other hand, if the duration time T0 of the first station 110 losing the medium synchronization is smaller or equal to the medium synchronization threshold (i.e., aMediumSync-Threshold), the first station 110 do not start the medium synchronization delay timer (i.e., MediumSyncDelay timer) after the non-AP MLD 10 returning to the listening operation.

In the fourth embodiment, when determining that the previous medium synchronization delay timer is not expired, the first station 110 updates the time value of the medium synchronization delay timer. In one embodiment, the first station 110 can update the time value of the medium synchronization delay timer to be a predetermined value. In another embodiment, the first station 110 can update the time value of the medium synchronization delay timer to be the time value of the previous medium synchronization delay timer, but the disclosure is not limited thereto.

Figure 6:
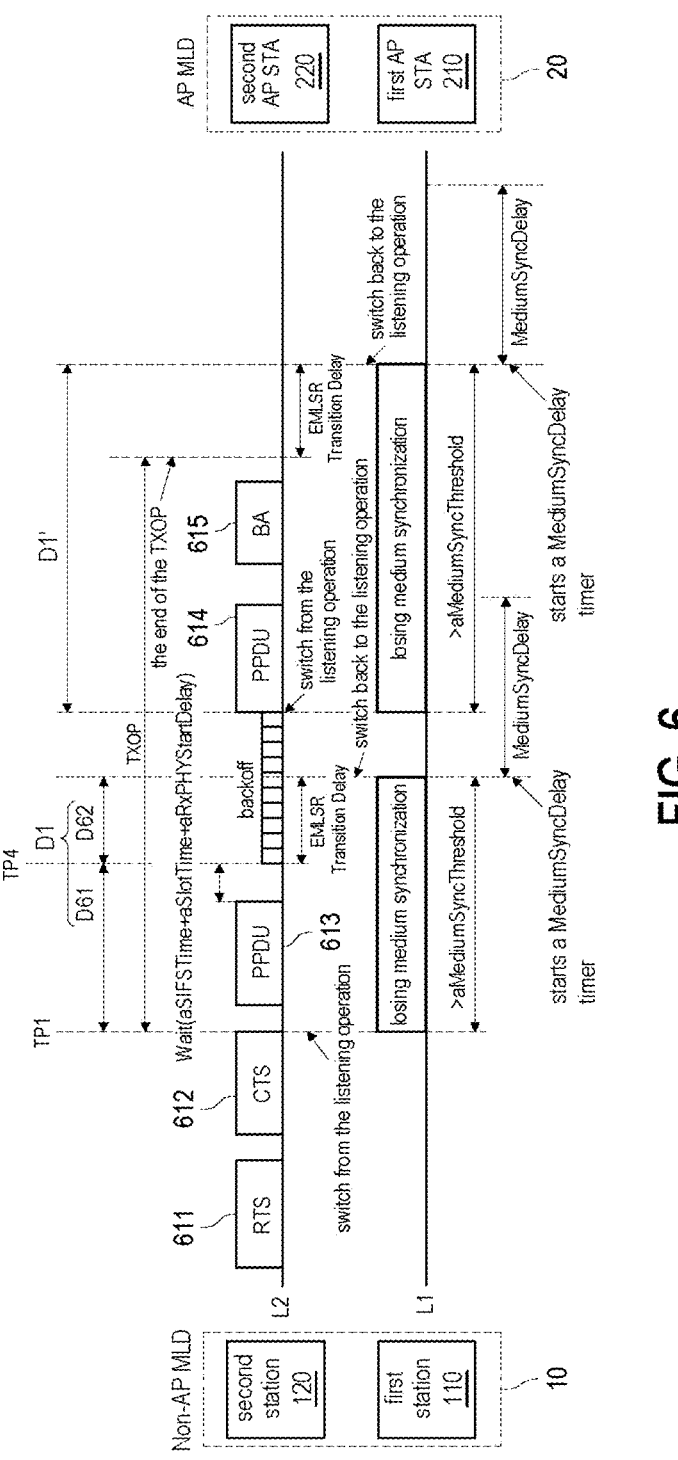
FIG. 6 shows a schematic diagram of the EMLSR transmission between the non-AP MLD and the AP MLD according to a fifth embodiment of the disclosure.

See FIG. 6, which shows a schematic diagram of the EMLSR transmission between the non-AP MLD and the AP MLD according to a fifth embodiment of the disclosure. In FIG. 6, the non-AP MLD 10 is operating in the EMLSR mode with the AP MLD 20 supporting the EMLSR mode. In the fifth embodiment, the second station 120 can send an RTS frame 611 to the second AP STA 220, and the second AP STA 220 can send a CTS frame 612 to the second station 120 in response to the RTS frame 611, wherein the CTS frame 612 can be used to inform the second station 120 that the second station 120 obtains a TXOP with the second AP STA 220, but the disclosure is not limited thereto.

In the fifth embodiment, when determining that the second station 120 obtains the TXOP with the second AP STA 220, the non-AP MLD 10 determines that the frame exchange is started between the second station 120 and the second AP STA 220. Accordingly, the non-AP MLD 10 starts to switch from the listening operation to the frame exchange operation. In this case, other non-AP STAs (e.g., the first station 110) operating on the other EMLSR links will lose the medium synchronization. In the fifth embodiment, the non-AP MLD 10 switches back to the listening operation after EMLSR Transition Delay when a non-initial PPDU (e.g., a PPDU 613) of the TXOP fails. In addition, the second station 120 can perform a backoff during the TXOP.

In the scenario of FIG. 6, the duration time T0 of the first station 110 losing the medium synchronization at least covers the first duration D1. For example, the duration time T0 can be equal to the first duration D1 in FIG. 6. In the fifth embodiment, the first duration D1 is a sum of a (EMLSR) transition delay D62 and a duration D61 between a first timing point TP1 and a fourth timing point TP4, wherein the first timing point TP1 is a timing point when the non-AP MLD 10 switches from the listening operation to the frame exchange operation, and the fourth timing point TP4 is a timing point when the second station 120 determines a non-initial PPDU (e.g., the PPDU 613) of the TXOP fails.

In FIG. 6, the fourth timing point TP4 can be determined by adding the wait time to the end of the PPDU 613. In one embodiment, the wait time can be a sum of aSIFSTime, aSlotTime, and aRxPHYStartDelay.

In the fifth embodiment, if the duration time T0 of the first station 110 losing the medium synchronization (due to the frame exchange of the second station 120 on the second EMLSR link L2) is longer than the medium synchronization threshold (i.e., aMediumSyncThreshold), the first station 110 starts the medium synchronization delay timer (i.e., MediumSyncDelay timer) immediately after the non-AP MLD 10 returning to the listening operation. On the other hand, if the duration time T0 of the first station 110 losing the medium synchronization is smaller or equal to the medium synchronization threshold (i.e., aMediumSync-Threshold), the first station 110 do not start the medium synchronization delay timer (i.e., MediumSyncDelay timer) after the non-AP MLD 10 returning to the listening operation.

In addition, after the second station 120 performs the backoff, the second station 120 can send another PPDU 614 to the second AP STA 220. Accordingly, the non-AP MLD 10 will switch from the listening operation to the frame exchange operation again, such that the first station 110 will lose the medium synchronization in the TXOP again. In one embodiment, the second AP STA 220 can send a BA 615 to the second station 120 in response to the PPDU 614.

In one embodiment, the non-AP MLD 10 can switch back to the listening operation again in response to the BA 615, and another duration time of the first station 110 losing the medium synchronization for the second time can at least cover a first duration D1'. For example, the another duration time can be equal to the first duration D1' in FIG. 6. In one embodiment, the way of determining the first duration D1' can be referred to the discussions of determining the first duration D1 in FIG. 4 and/or FIG. 5, which would not be repeated herein.

In the fifth embodiment, if the another duration time of the first station 110 losing the medium synchronization is longer than the medium synchronization threshold (i.e., aMedium-SyncThreshold), the first station 110 can start the medium synchronization delay timer (i.e., MediumSyncDelay timer) immediately after the non-AP MLD 10 returning to the listening operation again.

In the fifth embodiment, when determining that the previous medium synchronization delay timer is not expired, the first station 110 updates the time value of the medium synchronization delay timer. In one embodiment, the first station 110 can update the time value of the medium synchronization delay timer to be a predetermined value. In another embodiment, the first station 110 can update the time value of the medium synchronization delay timer to be the time value of the previous medium synchronization delay timer, but the disclosure is not limited thereto.

Figure 7:
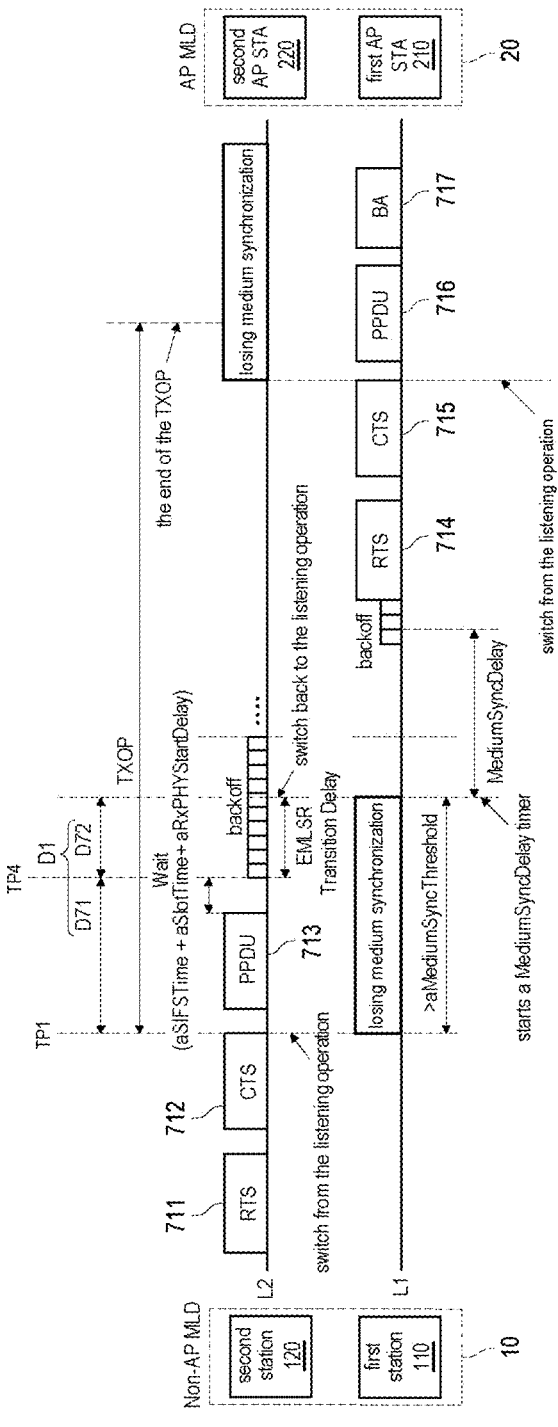
FIG. 7 shows another schematic diagram of the EMLSR transmission between the non-AP MLD and the AP MLD according to the fifth embodiment of the disclosure.'

See FIG. 7, which shows another schematic diagram of the EMLSR transmission between the non-AP MLD and the AP MLD according to the fifth embodiment of the disclosure.

In FIG. 7, the non-AP MLD 10 is operating in the EMLSR mode with the AP MLD 20 supporting the EMLSR mode. In the fifth embodiment, the second station 120 can send an RTS frame 711 to the second AP STA 220, and the second AP STA 220 can send a CTS frame 712 to the second station 120 in response to the RTS frame 711, wherein the CTS frame 712 can be used to inform the second station 120 that the second station 120 obtains a TXOP with the second AP STA 220, but the disclosure is not limited thereto.

In the fifth embodiment, when determining that the second station 120 obtains the TXOP with the second AP STA 220, the non-AP MLD 10 determines that the frame exchange is started between the second station 120 and the second AP STA 220. Accordingly, the non-AP MLD 110 starts to switch from the listening operation to the frame exchange operation. In this case, other non-AP STAs (e.g., the first station 110) operating on the other EMLSR links will lose the medium synchronization. In the fifth embodiment, the non-AP MLD 10 switches back to the listening operation after EMLSR Transition Delay when a non-initial PPDU (e.g., a PPDU 713) of the TXOP fails. In addition, the second station 120 can perform a backoff in the TXOP.

In the scenario of FIG. 7, the duration time T0 of the first station 110 losing the medium synchronization at least covers the first duration D1. For example, the duration time T0 can be equal to the first duration D1 in FIG. 7. In the fifth embodiment, the first duration D1 is a sum of a (EMLSR) transition delay D72 and a duration D71 between a first timing point TP1 and a fourth timing point TP4, wherein the first timing point TP1 is a timing point when the non-AP MLD 10 switches from the listening operation to the frame exchange operation, and the fourth timing point TP4 is a timing point when the second station 120 determines a non-initial PPDU (e.g., a PPDU 713) of the TXOP fails.

In FIG. 7, the fourth timing point TP4 can be determined by adding the wait time to the end of the PPDU 713. In one embodiment, the wait time can be a sum of aSIFSTime, aSlotTime, and aRxPHYStartDelay.

In the fifth embodiment, if the duration time T0 of the first station 110 losing the medium synchronization (due to the frame exchange of the second station 120 on the second EMLSR link L2) is longer than the medium synchronization threshold (i.e., aMediumSyncThreshold), the first station 110 starts the medium synchronization delay timer (i.e., MediumSyncDelay timer) immediately after the non-AP MLD 10 returning to the listening operation.

In FIG. 7, after the second station 120 performs the backoff, the first station 110 can send an RTS frame 714 to the first AP STA 210, and the first AP STA 210 can send a CTS frame 715 to the first station 110 in response to the RTS frame 714. Afterwards, a frame exchange between the first AP STA 210 and the first station 110 can be started, wherein this frame exchange may exemplarily include: (1) a PPDU 716 sent from the first station 110 to the first AP STA 210; (2) a BA 717 sent from the first AP STA 210 to the first station 110, but the disclosure is not limited thereto.

In FIG. 7, the non-AP MLD 10 determines that the frame exchange is started between the first station 110 and the first AP STA 210. Accordingly, the non-AP MLD 10 starts to switch from the listening operation to the frame exchange operation. In addition, other non-AP STAs (e.g., the second station 120) operating on the other EMLSR links will lose the medium synchronization. In the fifth embodiment, the non-AP MLD 10 switches back to the listening operation after EMLSR Transition Delay following the end of the frame exchange (e.g., the end time of the BA 717), but the disclosure is not limited thereto.

In the fifth embodiment, the second station 120 can determine the corresponding duration time of the second station 120 losing the medium synchronization (due to the frame exchange of the first station 110 on the first EMLSR link L1). In one embodiment, if the corresponding duration time of the second station 120 is longer than the medium synchronization threshold (i.e., aMediumSyncThreshold), the second station 120 can start the medium synchronization delay timer (i.e., MediumSyncDelay timer) immediately after the non-AP MLD 10 returning to the listening operation, but the disclosure is not limited thereto.

In other embodiments, the non-AP MLD 10 can perform further operations based on the time value of the medium synchronization delay timer. Detailed discussions would be provided in the following.

Figure 8:
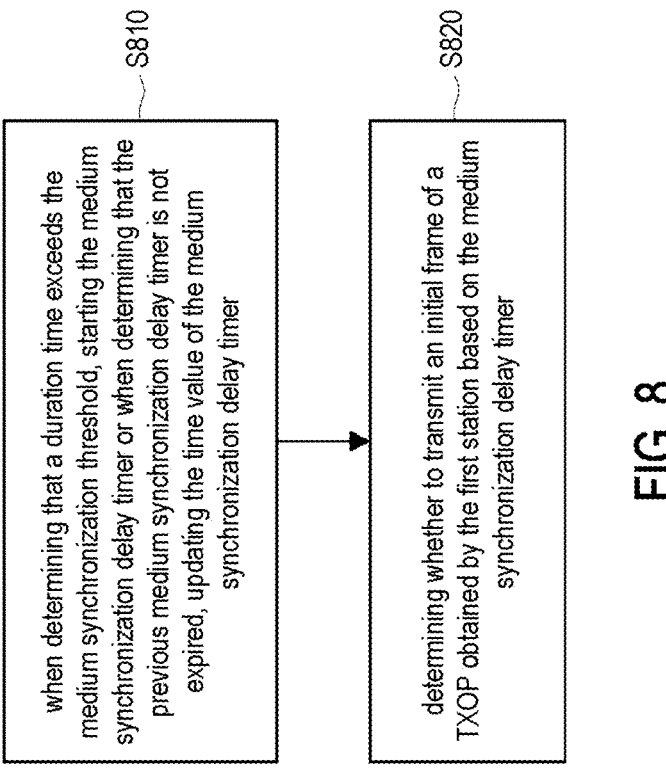
FIG. 8 shows another flow chart of the operating method for EMLSR according to an embodiment of the disclosure.

See FIG. 8, which shows another flow chart of the operating method for EMLSR according to an embodiment of the disclosure. The method of this embodiment can be executed by the first station 110 as well, and the introductions of the first station 110 can be referred to the above teachings, which would not be repeated herein.

In step S810, when determining that a duration time T0 exceeds the medium synchronization threshold (i.e., aMediumSyncThreshold), the first station 110 starts the medium synchronization delay timer (i.e., MediumSyncDelay timer) or when determining that the previous medium synchronization delay timer is not expired, the first station 110 updates the time value of the medium synchronization delay timer. Details of step S810 can be referred to the above teachings, which would not be repeated herein.

In step S820, the first station 110 determines whether to transmit an initial frame of a transmission opportunity (TXOP) obtained by the first station 110 based on the medium synchronization delay timer. Details related to step S820 would be introduced with the following embodiments.

Figure 9:
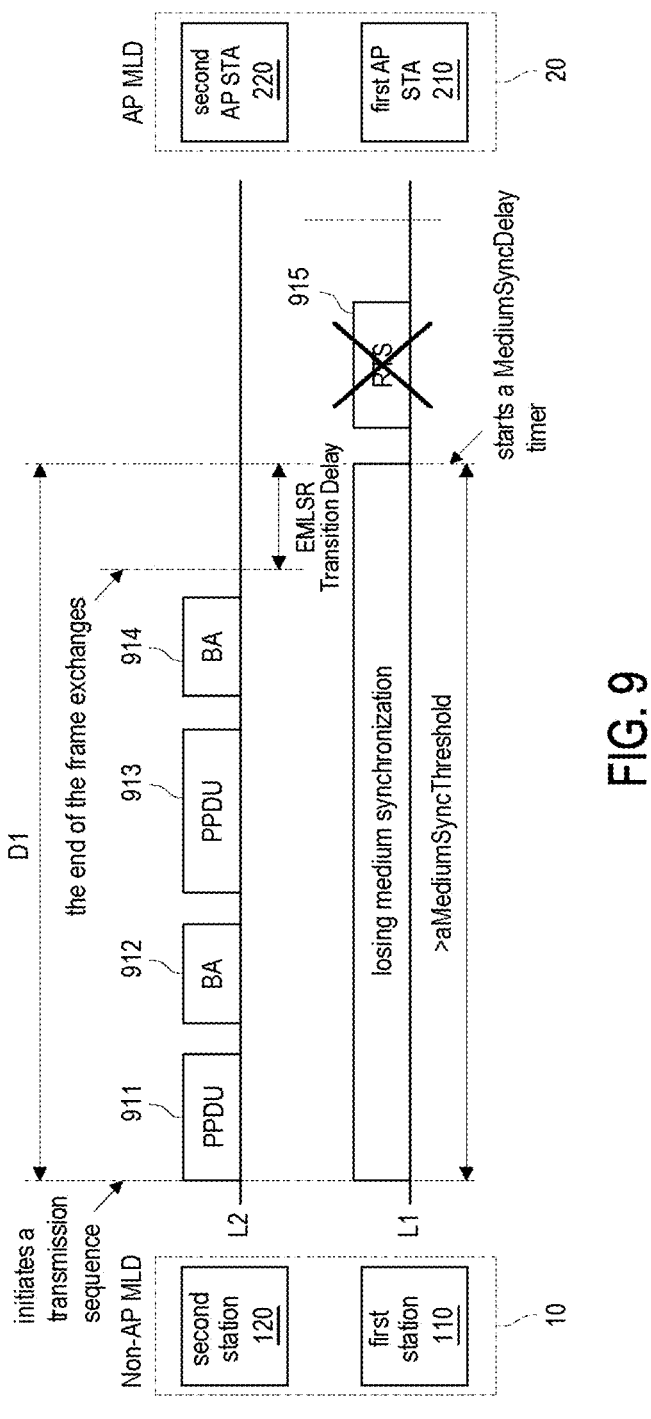
FIG. 9 shows a schematic diagram of the EMLSR transmission between the non-AP MLD and the AP MLD according to a first variation of a sixth embodiment of the disclosure.

See FIG. 9, which shows a schematic diagram of the EMLSR transmission between the non-AP MLD and the AP MLD according to a first variation of a sixth embodiment of the disclosure.

In the present embodiment, the second station 120 can initiate a transmission sequence on the second EMLSR link L2 with the second AP STA 220. In FIG. 9, the transmission sequence can exemplarily include: (1) a PPDU 911 sent from the second station 120 to the second AP STA 220; (2) a BA 912 sent from the second AP STA 220 to the second station 120; (3) a PPDU 913 sent from the second station 120 to the second AP STA 220; (4) a BA 914 sent from the second AP STA 220 to the second station 120. As taught in the above, the first station 110 will lose the medium synchronization, and the first station 110 can obtain the duration time T0 (which at least covers the firs duration D1) of the first station 110 losing the medium synchronization. For example, the duration time T0 can be equal to the first duration D1 in FIG. 9. The introduction of the first duration D1 can be referred to the above embodiments, which would not be repeated herein.

In FIG. 9, assuming that the first station 110 determines that the duration time T0 exceeds the medium synchronization threshold (i.e., aMediumSyncThreshold), the first station 110 starts the medium synchronization delay timer (i.e., MediumSyncDelay timer).

In one embodiment, the first station 110 can determine whether the medium synchronization delay timer has a nonzero value. In one embodiment, when determining that the medium synchronization delay timer has a nonzero value, the first station 110 disallows the first station 110 to transmit a RTS frame 915 as the initial frame of the TXOP obtained by the first station 110.

In one embodiment, the first station 110 performs a CCA when the medium synchronization delay timer has the nonzero value. In addition, when determining that the medium synchronization delay timer expires, the first station 110 can initiate a transmission when obtaining another TXOP.

In another embodiment, when determining that the medium synchronization delay timer does not have a nonzero value, the first station 110 allows the first station 110 to transmit the RTS frame 915 as the initial frame of the TXOP obtained by the first station 110.

Figure 10:
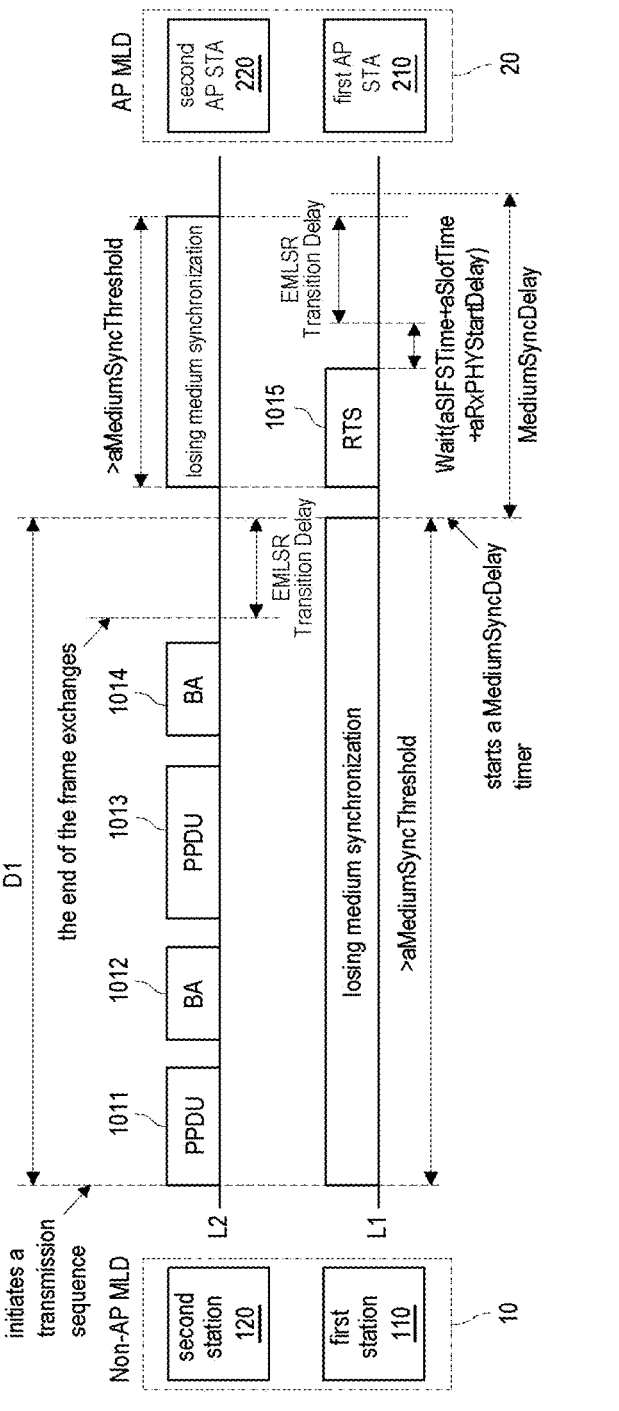
FIG. 10 shows a schematic diagram of the EMLSR transmission between the non-AP MLD and the AP MLD according to a second variation of the sixth embodiment of the disclosure.

See FIG. 10, which shows a schematic diagram of the EMLSR transmission between the non-AP MLD and the AP MLD according to a second variation of the sixth embodiment of the disclosure.

In the present embodiment, the second station 120 can initiate a transmission sequence on the second EMLSR link L2 with the second AP STA 220. In FIG. 10, the transmission sequence can include: (1) a PPDU 1011 sent from the second station 120 to the second AP STA 220; (2) a BA 1012 sent from the second AP STA 220 to the second station 120; (3) a PPDU 1013 sent from the second station 120 to the second AP STA 220; (4) a BA 1014 sent from the second AP STA 220 to the second station 120. As taught in the above, the first station 110 will lose the medium synchronization, and the first station 110 can obtain the duration time T0 (which at least covers the firs duration D1) of the first station 110 losing the medium synchronization. For example, the duration time T0 can be equal to the first duration D1 in FIG. 10. The introduction of the first duration D1 can be referred to the above embodiments, which would not be repeated herein.

In FIG. 10, assuming that the first station 110 determines that the duration time T0 exceeds the medium synchronization threshold (i.e., aMediumSyncThreshold), the first station 110 starts the medium synchronization delay timer (i.e., MediumSyncDelay timer).

In one embodiment, the first station 110 can determine whether the medium synchronization delay timer has a nonzero value and an accumulated time length of the first station 110 exceeds the medium synchronization threshold. In one embodiment, the accumulated time length of the first station 110 is a sum of the aforementioned wait time (i.e., the sum of aSIFSTime, aSlotTime, and aRxPHYStartDelay), a (EMLSR) transition delay, and a PPDU length of the RTS frame.

In one embodiment, when determining that the medium synchronization delay timer has a nonzero value and the accumulated time length of the first station 110 exceeds the medium synchronization threshold, the first station 110 disallows the first station 110 to transmit an RTS frame as the initial frame of the TXOP obtained by the first station 110.

In the scenario of FIG. 10, when determining that the medium synchronization delay timer has the nonzero value and the accumulated time length of the first station 110 is smaller or equal to the medium synchronization threshold, the first station 110 can allow the first station 110 to transmit the RTS frame 1015 as the initial frame of the TXOP.

In FIG. 10, after the first station 110 transmit the RTS frame 1015 to the first AP STA 210, the second station 120 will lose the medium synchronization accordingly.

Figure 11:
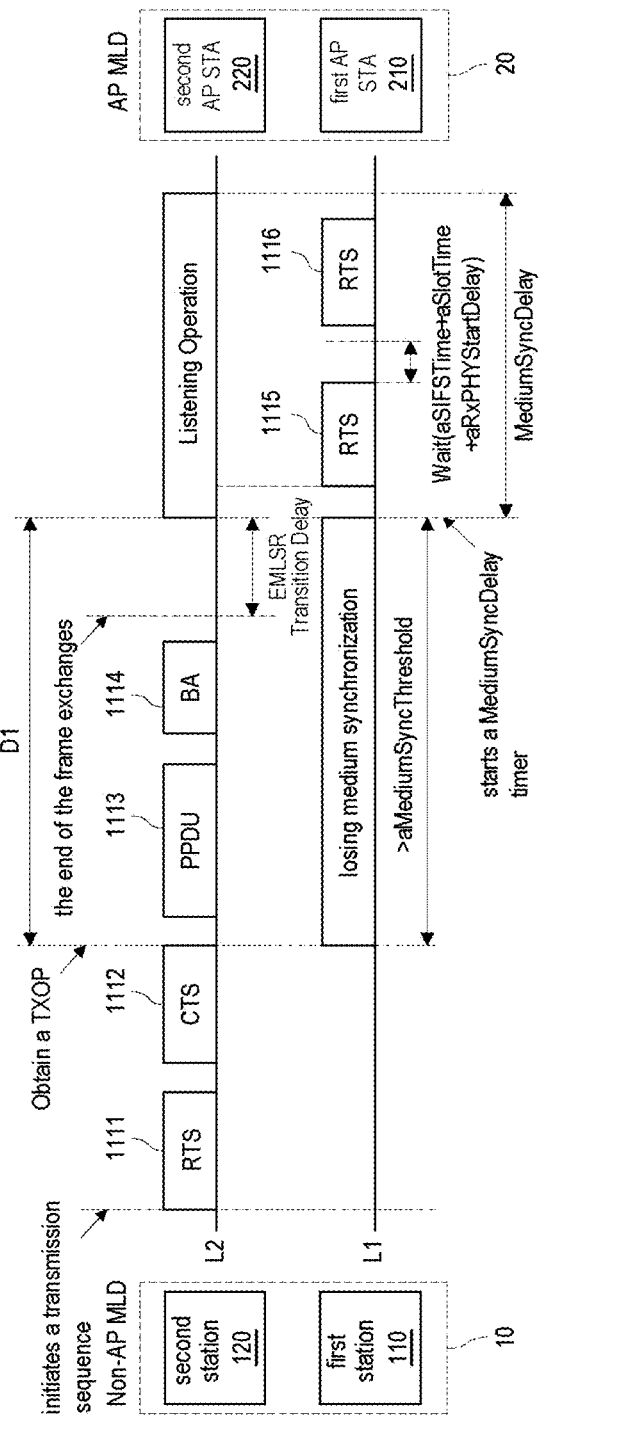
FIG. 11 shows a schematic diagram of the EMLSR transmission between the non-AP MLD and the AP MLD according to a third variation of the sixth embodiment of the disclosure.

See FIG. 11, which shows a schematic diagram of the EMLSR transmission between the non-AP MLD and the AP MLD according to a third variation of the sixth embodiment of the disclosure.

In the present embodiment, the second station 120 can send a RTS frame 1111 to the second AP STA 220, and the second AP STA 120 can send a CTS frame 1112 in response to the RTS frame 1111, wherein the CTS frame 1112 can be used to inform the second station 120 that the second station 120 obtains a TXOP. Afterwards, the second station 120 can send a PPDU 1113 to the second AP STA 220, and the second AP STA 120 can send a BA 1114 to the second station 120. As taught in the above, the first station 110 will lose the medium synchronization, and the first station 110 can obtain the duration time T0 (which at least covers the firs duration D1) of the first station 110 losing the medium synchronization. The introduction of the first duration D1 can be referred to the above embodiments, which would not be repeated herein.

In FIG. 11, assuming that the first station 110 determines that the duration time TO exceeds the medium synchronization threshold (i.e., aMediumSyncThreshold), the first station 110 starts the medium synchronization delay timer (i.e., MediumSyncDelay timer).

In one embodiment, the first station 110 can determine whether the medium synchronization delay timer has a nonzero value. In one embodiment, when determining that the medium synchronization delay timer has a nonzero value, the first station 110 allows the first station 110 to transmit an RTS frame 1116 as the initial frame of the TXOP, wherein the first station 110 is not allowed to switch to a receive or transmission operation using more than one spatial stream unless the first station 110 obtains the TXOP.

In FIG. 11, since the second AP STA 210 does not send a CTS frame back to the first station 110, the first station 110 can send another RTS frame 1116 to the second AP STA 210 for attempting to obtain a TXOP. In one embodiment, the first station 110 can wait for the aforementioned wait time after the end of the RTS frame 1115 to send the RTS frame 1116. In this case, the first station 110 is not allowed to switch to a receive or transmission operation using more than one spatial stream before successfully obtain a TXOP, but the disclosure is not limited thereto.

The above mainly introduces the solutions of the embodiments of the disclosure from the perspective of the execution process on the method side. It can be understood that, in order to realize the above-mentioned functions, each of the STAs/MLDs includes a hardware structure and/or a software module corresponding to each function. Those skilled in the art should easily realize that, in combination with the modules and algorithm steps of the examples described in the embodiments provided herein, the disclosure can be implemented in the form of hardware or a combination of hardware and computer software. Whether a function is executed by hardware or computer software-driven hardware depends on the specific application and design constraints of the technical solution. Professional technicians can use different methods for each specific application to implement the described functions, but such implementation should not be considered beyond the scope of this application.

The embodiments of the disclosure may divide the functional module of the MLD according to the above method example, for example, each functional module may be divided corresponding to each function, or two or more functions may be integrated into one processing module. The above integrated module may be implemented in the form of hardware or software functional module. It should be noted that the division of the modules in the embodiments of the disclosure is schematic, and is only a division of logical functions. In actual implementation, there may be another division manner.

Figure 12:
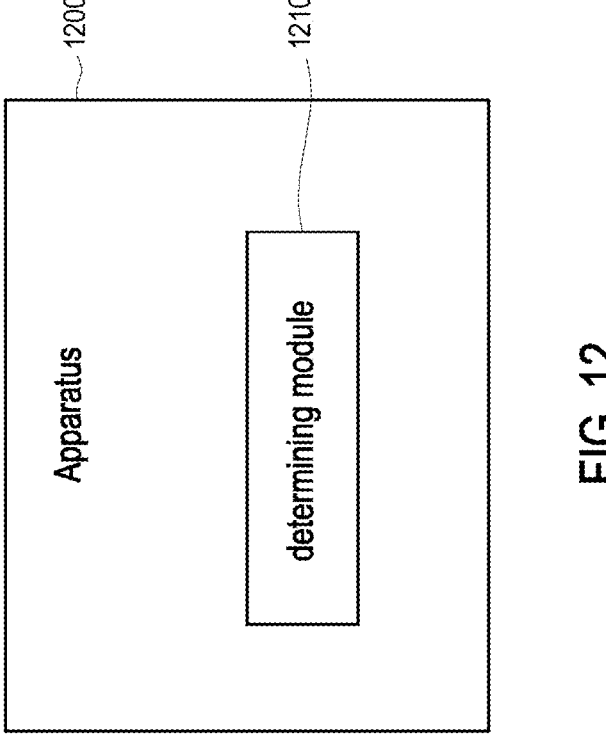
FIG. 12 is a block diagram of a communication apparatus according to an exemplary embodiment of the present disclosure.

FIG. 12 is a block diagram of a communication apparatus 1200 according to an exemplary embodiment of the present disclosure. Referring to FIG. 12, the communication apparatus 1200, which is applied to the aforementioned non-AP MLD (e.g., the non-AP MLD 10) and/or the STAs (e.g., the first station 110) affiliated with the non-AP MLD, may include a determining module 1210.

In one embodiment, the determining module 1210 determines a duration time, wherein the duration time at least covers a first duration where the first station has lost a medium synchronization, wherein the first station is affiliated with an MLD (multi-link device) operating in an EMLSR mode, and the first station operates on a first EMLSR link among a plurality of EMLSR links of the MLD. The determining module 1210 determines whether to start a medium synchronization delay timer based on the duration time or whether to update a time value of the medium synchronization delay timer based on a previous medium synchronization delay timer.

In one embodiment, the first duration where the first station has lost the medium synchronization at least covers a second duration from the MLD switching from a listening operation to a frame exchange operation to the MLD switching back to the listening operation from the frame exchange operation.

In one embodiment, the second station performs a frame exchange during the MLD is in the frame exchange operation, and the second station is affiliated with the MLD, and the frame exchange is performed on a second EMLSR link where the second station operates on.

In one embodiment, the MLD is a non-AP (access point) MLD.

In one embodiment, the first duration where the first station has lost the medium synchronization at least covers a third duration between a first event and a second event, wherein the first event is where the MLD switches from a listening operation to a frame exchange operation, and the second event is where the MLD switches back to the listening operation from the frame exchange operation.

In one embodiment, the first station and the second station respectively communicate with a first AP STA and a second AP STA in an AP MLD via the first EMLSR link and the second EMLSR link.

In one embodiment, the determining module 1210 performs: when determining that the MLD is performing the listening operation, determining, by the first station, whether the first station loses the medium synchronization due to the frame exchange started between the second station and the second AP STA; when determining that the first station loses the medium synchronization, determining, by the first station, that the MLD switches from the listening operation to the frame exchange operation.

In one embodiment, the determining module 1210 performs: when determining that the MLD switches back to the listening operation based on an end of the frame exchange, determining, by the first station, that the MLD switches back to the listening operation from the frame exchange operation.

In one embodiment, the first duration is a sum of a duration from the MLD switching from the listening operation to the frame exchange operation to the end of the frame exchange and a transition delay of the MLD.

In one embodiment, wherein the first station is unable to listen on the first EMLSR link during the second station performing the frame exchange.

In one embodiment, the determining module 1210 performs: when determining that the second station initiates a transmission sequence in a first transmission opportunity (TXOP) with the second AP STA, determining, by the MLD, that the frame exchange is started between the second station and the second AP STA.

In one embodiment, the first duration is a sum of a transition delay and a duration between a first timing point and a second timing point, wherein the first timing point is a timing point when the MLD switches from the listening operation to the frame exchange operation, and the second timing point is a timing point when the MLD determines that a transmission of the medium access control (MAC) protocol data unit (MPDU) in an initial Presentation Protocol Data Unit (PPDU) of the first TXOP fails.

In one embodiment, the first duration is a sum of a transition delay and a duration between a first timing point and a third timing point, wherein the first timing point is a timing point when the MLD switches from the listening operation to the frame exchange operation, and the third timing point is a timing point of an end time of the frame exchange or an end time of the first TXOP.

In one embodiment, the determining module 1210 performs: when determining that the second station obtains a first TXOP with the second AP STA, determining, by the MLD, that the frame exchange is started between the second station and the second AP STA.

In one embodiment, the first duration is a sum of a transition delay and a duration between a first timing point and a third timing point, wherein the first timing point is a timing point when the MLD switches from the listening operation to the frame exchange operation, and the third timing point is a timing point of an end time of the frame exchange or an end time of the first TXOP.

In one embodiment, the first duration is a sum of a transition delay and a duration between a first timing point and a fourth timing point, wherein the first timing point is a timing point when the MLD switches from the listening operation to the frame exchange operation, and the fourth timing point is a timing point when the second station determines a non-initial PPDU of the first TXOP fails.

In one embodiment, the determining module 1210 performs: when determining that the duration time exceeds a medium synchronization threshold, starting, by the first station, the medium synchronization delay timer; or when determining that the previous medium synchronization delay timer is not expired, updating, by the first station, the time value of the medium synchronization delay timer.

In one embodiment, after starting the medium synchronization delay timer, the determining module 1210 performs: determining whether to transmit an initial frame of a TXOP obtained by the first station based on the medium synchronization delay timer.

In one embodiment, the determining module 1210 performs: when determining that the medium synchronization delay timer has a nonzero value, disallowing, by the first station, the first station to transmit a Request To Send (RTS) frame as the initial frame of the TXOP obtained by the first station.

In one embodiment, the determining module 1210 further performs: performing, by the first station, a Clear Channel Assessment (CCA) when the medium synchronization delay timer has the nonzero value; when determining that the medium synchronization delay timer expires, initiating, by the first station, a transmission when obtaining another TXOP.

In one embodiment, the determining module 1210 performs: when determining that the medium synchronization delay timer has a nonzero value and an accumulated time length of the first station exceeds the medium synchronization threshold, disallowing the first station to transmit an RTS frame as the initial frame of the TXOP obtained by the first station; when determining that the medium synchronization delay timer has the nonzero value and the accumulated time length of the first station is smaller or equal to the medium synchronization threshold, allowing the first station to transmit the RTS frame as the initial frame of the TXOP.

In one embodiment, the accumulated time length of the first station is a sum of a Short Interframe Space (SIFS) time, a slot time, a receiving physical start delay, a transition delay, and a PPDU length of the RTS frame.

In one embodiment, the determining module 1210 performs: when determining that the medium synchronization delay timer has a nonzero value, allowing, by the first station, the first station to transmit an RTS frame as the initial frame of the TXOP, wherein the first station is not allowed to switch to a receive or transmission operation using more than one spatial stream unless the first station obtains the TXOP.

In one embodiment, the determining module 1210 performs: when determining that the duration time is smaller or equal to a medium synchronization threshold, not starting, by the first station, the medium synchronization delay timer.

It should be noted that the user equipment described in the embodiments of the disclosure are presented in the form of functional modules. The term "module" used herein should be understood as the widest possible meaning. The object used to implement the functions described by each "module" can be, for example, an integrated circuit ASIC, a single circuit, or a chip, used to execute one or more software or firmware. The program's processor (shared, dedicated, or chipset) and memory, combined logic circuits, and/or other suitable components that provide the functions described above.

Figure 13:
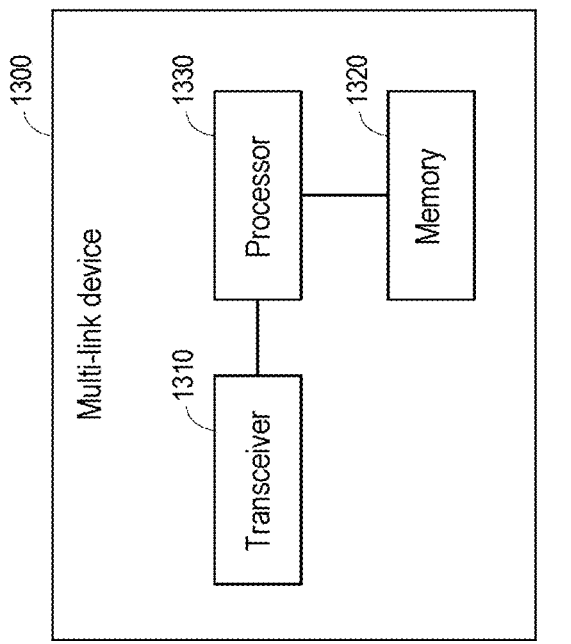
FIG. 13 is a block diagram of a multi-link device according to an exemplary embodiment of the present disclosure.

FIG. 13 is a block diagram of a multi-link device 1300 according to an exemplary embodiment of the present disclosure. Referring to FIG. 13, the multi-link device 1300, which is applied to the aforementioned non-AP MLD, may include one or more transceivers 1310, one or more memories 1320, and one or more processors 1330. A program code is stored on the memory 1320 and run on the processor 1330. The program code implements the steps of the communication method described in any one of FIG. 1 and FIG. 8 when being executed by the processor. The transceivers 1310 communicate with other electronic devices over a wireless network (e.g., WLAN) and typically operate according to IEEE standards (e.g., IEEE 802.11ax, IEEE 802.11ay, IEEE 802.11be, etc.). One transceiver 1310 may establish multiple EMLSR links (e.g., the first EMLSR link L1 and the second EMLSR link L2). The multi-link device 1300 may be any type of device that includes, but are not limited to subscriber equipment, wireless transmitter/receiver unit (WTRU), mobile station, an advanced mobile station (AMS), a telephone apparatus, customer premise equipment (CPE), a wireless sensor, a handheld device with wireless communication function, a computing device or other processing devices connected to wireless modems, an in-vehicle device, a wearable device, or the like.

Since the program code stored in the multi-link device 1300 adopts all the technical solutions of all the foregoing embodiments when being executed by the processor 1330, it at least has all the advantageous effects brought by all the technical solutions of all the foregoing embodiments, and no further description is incorporated herein.

Furthermore, an embodiment of the present disclosure further provides a non-transitory computer-readable storage medium having a program code stored on the computer-readable storage medium to cause a computer to perform the communication method described in any one of FIG. 1 and FIG. 8.

Since the program code stored in the computer-readable storage medium adopts all the technical solutions of all the foregoing embodiments when being executed by the processor, it at least has all the advantageous effects brought by all the technical solutions of all the foregoing embodiments, and no further description is incorporated herein.

It should be noted that, for the foregoing method embodiments, for the sake of simple description, they are all described as a series of action combinations. However, those skilled in the art should know that this application is not limited by the described action order. Because according to the disclosure, certain steps may be performed in another order or simultaneously. Secondly, those skilled in the art should also know that the embodiments described in the specification are all preferred embodiments, and the actions and modules involved are not necessarily required for this application.

In the above embodiments, the description of each embodiment has its own emphasis. For a part that is not described in detail in one embodiment, reference may be made to related descriptions in other embodiments.

In the several embodiments provided in this application, it should be understood that the disclosed device may be implemented in other ways. For example, the device embodiments described above are only schematic. For example, the division of the module is only a logical function division. In actual implementation, there may be another division manner. For example, multiple modules or components may be combined or may Integration into another system, or some features can be ignored or not implemented. In addition, the displayed or discussed mutual coupling or direct coupling or communication connection may be indirect coupling or communication connection through some interfaces, devices or modules, and may be electrical or other forms.

The modules described as separate components may or may not be physically separated, and the components displayed as modules may or may not be physical units, may be located in one place, or may be distributed on multiple network units. Some or all of the modules may be selected according to actual needs to achieve the objective of the solution of this embodiment.

In addition, each functional module in each embodiment of the disclosure may be integrated into one processing module, or each of the modules may exist separately physically, or two or more modules may be integrated into one module. The above integrated module may be implemented in the form of hardware or in the form of software program modules.

When the integrated module is implemented in the form of a software program module and sold or used as an independent product, it may be stored in a computer-readable memory. Based on such an understanding, the technical solution of the disclosure essentially or part that contributes to the existing technology or all or part of the technical solution can be embodied in the form of a software product, which is stored in a memory, several instructions are included to enable a computer device (which may be a personal computer, a server, or a network device, etc.) to perform all or part of the steps of the method described in the embodiments of the disclosure. The foregoing memory includes a flash disk, a read-only memory (ROM), a random access memory (RAM), a mobile hard disk, a magnetic disk, or an optical disk, and other media that can store program codes.

The embodiments of the disclosure further provide a chip. The chip includes a processor, and the processor can call and run a computer program from the memory to implement the method in the embodiment of the disclosure.

Optionally, the chip may further include a memory. The processor may call and run a computer program from the memory to implement the method in the embodiment of the disclosure.

The memory may be a separate device independent of the processor, or may be integrated in the processor.

Optionally, the chip may further include an input interface. The processor can control the input interface to communicate with other devices or chips, and specifically, can obtain information or data sent by other devices or chips.

Optionally, the chip may further include an output interface. The processor can control the output interface to communicate with other devices or chips, and specifically, can output information or data to other devices or chips.

Optionally, the chip can be applied to the network device in the embodiment of the disclosure, and the chip can implement the corresponding process implemented by the network device in various methods in the embodiment of the disclosure. For conciseness, related details are omitted.

Optionally, the chip can be applied to the mobile terminal/terminal device in the embodiment of the disclosure, and the chip can implement the corresponding process implemented by the mobile terminal/terminal device in various methods in the embodiment of the disclosure. For conciseness, related details are omitted.

It should be understood that the chip mentioned in the embodiment of the disclosure may also be referred to as a system-level chip, a system chip, a chip system, or a system-on-chip, etc.

It should be understood that the memory described above is exemplary but not restrictive. For example, the memory in the embodiment of the disclosure may also be static RAM (SRAM), dynamic RAM (DRAM), synchronous DRAM (SDRAM), double data rate SDRAM (DDR SDRAM), enhanced SDRAM (ESDRAM), synch link DRAM (SL-DRAM) and Direct Rambus RAM (DR RAM), etc. That is to say, the memory in the embodiments of the disclosure is intended to include, but is not limited to, these and any other suitable types of memory.

The embodiments of the disclosure further provide a computer program product, including computer program instructions.

Optionally, the computer program product may be applied to the communication device in the embodiment of the disclosure, and the computer program instructions enable the computer to execute the corresponding process implemented by the communication device in various methods of the embodiment of the disclosure. For conciseness, related details are omitted.

The embodiment of the disclosure further provides a computer program.

Optionally, the computer program can be applied to the communication device in the embodiment of the disclosure. When the computer program is run on the computer, the computer can execute the corresponding process implemented by the communication device in various methods of the embodiment of the disclosure. For conciseness, related details are omitted.

In summary, the embodiments of the disclosure provide operating methods of EMLSR. The EMLSR operations are important functions specified in IEEE 802.11be, which is the next-generation Wi-Fi standard. Some of the solutions described in this disclosure are suitable to be applied in 802.11be standard and suitable to be adopted in the Wi-Fi APs and STAs.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. An operating method for enhanced multi-link single radio (EMLSR), comprising:
determining, by a first station, a duration time, wherein the duration time at least covers a first duration where the first station has lost a medium synchronization, wherein the first station is affiliated with a multi-link device (MLD) operating in an EMLSR mode, and the first station operates on a first EMLSR link among a plurality of EMLSR links of the MLD; and
determining, by the first station, whether to start a medium synchronization delay timer based on the duration time,
wherein the first duration where the first station has lost the medium synchronization at least covers a third duration between a first event and a second event, wherein the first event is where the MLD switches from a listening operation to a frame exchange operation, and the second event is where the MLD switches back to the listening operation from the frame exchange operation, and
wherein the MLD is a non-access point, non-AP, MLD.

2. The method according to claim 1, wherein the first duration where the first station has lost the medium synchronization at least covers a second duration from the MLD switching from the listening operation to the frame exchange operation to the MLD switching back to the listening operation from the frame exchange operation.

3. The method according to claim 2, wherein the first duration does not start with a Multi-user Request To Send (MU-RTS) Trigger Frame (TF).

4. The method according to claim 2, wherein a second station performs a frame exchange while the MLD is in the frame exchange operation, and the second station is affiliated with the MLD, and the frame exchange is performed on a second EMLSR link where the second station operates on.

5. The method according to claim 4, wherein the first station and the second station respectively communicate with a first AP station and a second AP station in an AP MLD via the first EMLSR link and the second EMLSR link.

6. The method according to claim 5, comprising:
when determining that the MLD is performing the listening operation, determining, by the first station, whether the first station loses the medium synchronization due to the frame exchange started between the second station and the second AP station;
when determining that the first station loses the medium synchronization, determining, by the first station, that the MLD switches from the listening operation to the frame exchange operation.

7. The method according to claim 6, wherein the first duration is a sum of a duration from the MLD switching from the listening operation to the frame exchange operation to the end of the frame exchange and a transition delay of the MLD.

8. The method according to claim 1, wherein the third duration includes a duration from the MLD switching from a listening operation to an end of a frame exchange operation and a duration from the end of the frame exchange operation to the MLD switching back to the listening operation from the frame exchange operation.

9. The method according to claim 1, wherein the step of determining, by the first station, whether to start the medium synchronization delay timer based on the duration time comprises:
when determining that the duration time exceeds a medium synchronization threshold, starting, by the first station, the medium synchronization delay timer.

10. The method according to claim 1, wherein the MLD is a non-AP MLD, and the step of determining, by the first station, whether to start the medium synchronization delay timer based on the duration time comprises:

when determining that the duration time of the first station losing the medium synchronization is longer than a medium synchronization threshold, starting, by the first station, the medium synchronization delay timer immediately after the non-AP MLD returning to a listening operation.

11. A first station, comprising:

a memory configured to store instructions;

a processor, coupled with the memory, the processor, when executing the instructions, is configured to:

determine a duration time, wherein the duration time at least covers a first duration where the first station has lost a medium synchronization, wherein the first station is configured to be affiliated with a multi-link device (MLD) operating in an EMLSR mode, and the first station is configured to operate on a first enhanced multi-link single radio (EMLSR) link among a plurality of EMLSR links of the MLD; and determine whether to start a medium synchronization delay timer based on the duration time, wherein the first duration where the first station has lost the medium synchronization at least covers a third duration between a first event and a second event, wherein the first event is where the MLD switches from a listening operation to a frame exchange operation, and the second event is where the MLD switches back to the listening operation from the frame exchange operation, and wherein the MLD is a non-access point, non-AP, MLD.

12. The first station according to claim 11, wherein the first duration where the first station has lost the medium synchronization at least covers a second duration from the MLD switching from the listening operation to the frame exchange operation to the MLD switching back to the listening operation from the frame exchange operation.

13. The first station according to claim 12, wherein the first duration does not start with a Multi-user Request To Send (MU-RTS) Trigger Frame (TF).

14. The first station according to claim 12, wherein the first station is configured to communicate with a first AP station in an AP MLD via the first EMLSR link.

15. The first station according to claim 14, wherein the processor is configured to:

when determining that the MLD is performing the listening operation, determine whether the first station loses the medium synchronization due to the frame exchange started between the second station and the second AP station;

when determining that the first station loses the medium synchronization, determine that the MLD switches from the listening operation to the frame exchange operation.

16. The first station according to claim 15, wherein the first duration is a sum of a duration from the MLD switching from the listening operation to the frame exchange operation to the end of the frame exchange and a transition delay of the MLD.

17. The first station according to claim 11, wherein the third duration includes a duration from the MLD switching from a listening operation to an end of a frame exchange operation and a duration from the end of the frame exchange operation to the MLD switching back to the listening operation from the frame exchange operation.

18. The first station according to claim 11, wherein in determining whether to start the medium synchronization delay timer based on the duration time, the processor is configured to:

when determining that the duration time exceeds a medium synchronization threshold, start the medium synchronization delay timer.

19. The first station according to claim 11, wherein the MLD is a non-AP MLD, and in determining, by the first station, whether to start the medium synchronization delay timer based on the duration time, the processor is configured to:

when determining that the duration time of the first station losing the medium synchronization is longer than a medium synchronization threshold, start the medium synchronization delay timer immediately after the non-AP MLD returning to a listening operation.

20. A chip, comprising: a processor, and configured to call and run a computer program from a memory, so that a first station provided with the chip executes an operating method for enhanced multi-link single radio (EMLSR), the method comprising:

determining a duration time, wherein the duration time at least covers a first duration where the first station has lost a medium synchronization, wherein the first station is affiliated with an multi-link device (MLD) operating in an EMLSR mode, and the first station operates on a first EMLSR link among a plurality of EMLSR links of the MLD; and determining whether to start a medium synchronization delay timer based on the duration time, wherein the first duration where the first station has lost the medium synchronization at least covers a third duration between a first event and a second event, wherein the first event is where the MLD switches from a listening operation to a frame exchange operation, and the second event is where the MLD switches back to the listening operation from the frame exchange operation, and wherein the MLD is a non-access point, non-AP, MLD.

* * * * *